United States Patent
Apostolo et al.

(10) Patent No.: US 10,533,064 B2
(45) Date of Patent: Jan. 14, 2020

(54) FLUOROELASTOMERS

(75) Inventors: Marco Apostolo, Senago (IT); Liubov Chernysheva, Caronno Pertusella (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 0 days.

(21) Appl. No.: 13/877,822

(22) PCT Filed: Oct. 7, 2011

(86) PCT No.: PCT/EP2011/067575
§ 371 (c)(1),
(2), (4) Date: Apr. 4, 2013

(87) PCT Pub. No.: WO2012/049093
PCT Pub. Date: Apr. 19, 2012

(65) Prior Publication Data
US 2013/0197163 A1 Aug. 1, 2013

(30) Foreign Application Priority Data
Oct. 15, 2010 (EP) .................................... 10187722

(51) Int. Cl.
| | | |
|---|---|---|
| C08F 214/22 | (2006.01) | |
| C08F 214/28 | (2006.01) | |
| C08F 214/26 | (2006.01) | |
| C08F 236/20 | (2006.01) | |

(52) U.S. Cl.
CPC ........ *C08F 214/282* (2013.01); *C08F 214/22* (2013.01); *C08F 214/222* (2013.01); *C08F 214/225* (2013.01); *C08F 214/28* (2013.01); *C08F 214/26* (2013.01); *C08F 236/20* (2013.01)

(58) Field of Classification Search
CPC .... C08F 214/22; C08F 214/26; C08F 214/28; C08F 2810/20
See application file for complete search history.

(56) References Cited

U.S. PATENT DOCUMENTS

| | | |
|---|---|---|
| 3,752,787 A | 8/1973 | De Brunner |
| 3,876,654 A | 4/1975 | Pattison |
| 4,035,565 A | 7/1977 | Apotheker et al. |
| 4,233,427 A | 11/1980 | Bargain et al. |
| 4,243,770 A | 1/1981 | Tatemoto et al. |
| 4,259,463 A | 3/1981 | Moggi et al. |
| 4,564,662 A | 1/1986 | Albin |
| 4,694,045 A | 9/1987 | Moore |
| 4,745,165 A | 5/1988 | Arcella et al. |
| 4,943,622 A | 7/1990 | Naraki et al. |
| 5,173,553 A | 12/1992 | Albano et al. |
| 5,585,449 A | 12/1996 | Arcella et al. |
| 5,902,857 A | 5/1999 | Wlassics et al. |
| 5,948,868 A | 9/1999 | Albano et al. |
| 6,111,028 A * | 8/2000 | Brinati et al. ............. 525/326.3 |
| 6,310,142 B1 | 10/2001 | Apostolo et al. |
| 6,500,903 B2 | 12/2002 | Wlassics et al. |
| 6,642,331 B2 | 11/2003 | Apostolo et al. |
| 7,101,943 B2 | 9/2006 | Arrigoni et al. |
| 7,488,787 B2 | 2/2009 | Apostolo et al. |
| 7,514,512 B2 | 4/2009 | Apostolo et al. |
| 2004/0097675 A1 | 5/2004 | Ameduri et al. |
| 2009/0005511 A1 | 1/2009 | Albano et al. |
| 2009/0253854 A1* | 10/2009 | Xu et al. ...................... 524/520 |

(Continued)

FOREIGN PATENT DOCUMENTS

| | | |
|---|---|---|
| EP | 0120462 A1 | 10/1984 |
| EP | 0136596 A2 | 4/1985 |
| EP | 0182299 A2 | 5/1986 |
| EP | 0199138 A2 | 10/1986 |
| EP | 0335705 A1 | 10/1989 |
| EP | 0410351 A1 | 1/1991 |
| EP | 0661304 A1 | 7/1995 |
| EP | 0684277 A1 | 11/1995 |
| EP | 0838482 A2 | 4/1998 |
| EP | 0860436 A1 | 8/1998 |
| EP | 0967248 A1 | 12/1999 |

(Continued)

OTHER PUBLICATIONS

Standard ASTM D1646, "Standard Test Methods for Rubber—Viscosity, Stress Relaxation, and Pre-Vulcanization Characteristics (Mooney Viscometer)", 2007, A00953640, ASTM International, pp. 1-12; 12 pgs.

*Primary Examiner* — Robert C Boyle
(74) *Attorney, Agent, or Firm* — Osha Liang LLP

(57) ABSTRACT

The invention pertains to peroxide-curable fluoroelastomers for the oil and gas industry, including explosive decompression, and which can be easily processed to yield cured parts in standard machineries at reasonable throughput rates, said fluoroelastomers comprising:

recurring units derived from vinylidene fluoride (VDF);
recurring units derived from hexafluoropropylene (HFP);
recurring units derived from at least one bis-olefin [bis-olefin (OF)] having general formula:

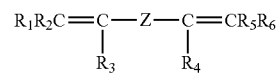

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical; and iodine or bromine cure-sites;

said fluoroelastomers further possessing a Mooney viscosity (ML) of at least 85 MU (1+10@121° C.), when measured according to ASTM D1646.

15 Claims, No Drawings

(56) References Cited

U.S. PATENT DOCUMENTS

| | | | |
|---|---|---|---|
| 2009/0286922 A1 | 11/2009 | Stanga et al. | |
| 2011/0077371 A1* | 3/2011 | Sato et al. | 526/252 |
| 2012/0077939 A1* | 3/2012 | Ota et al. | 525/326.3 |

FOREIGN PATENT DOCUMENTS

| | | |
|---|---|---|
| EP | 2284145 A1 | 2/2011 |
| JP | 2004-526000 A | 8/2004 |
| JP | 2008-303321 A | 12/2008 |
| WO | WO 9502634 A1 | 1/1995 |
| WO | WO 9705122 A1 | 2/1997 |
| WO | WO 2007082867 A2 | 7/2007 |
| WO | WO 2008003635 A1 | 1/2008 |
| WO | WO 2009/151109 * | 12/2009 |

* cited by examiner

FLUOROELASTOMERS

CROSS-REFERENCE TO RELATED APPLICATIONS

This application is a U.S. national stage entry under 35 U.S.C. § 371 of International Application No. PCT/EP2011/067575 filed Oct. 7, 2011, which claims priority to European application No. EP 10187722.3 filed on Oct. 15, 2010, the whole content of this application being incorporated herein by reference for all purposes.

TECHNICAL FIELD

The invention pertains to fluoroelastomers having improved mechanical properties and resistance to chemicals, and to their use for the manufacture of shaped articles suitable for oil and gas industry.

BACKGROUND ART

Since several years, vinylidene fluoride based fluoroelastomers have successfully found application in the energy, oil and gas industry, thanks to their outstanding mechanical properties in a broad temperature operating window and to their chemical resistance. They have been thus used as sealants or flexible components in diverse equipments like notably valves (ball valves, check valves, control valves), separation equipments, connector systems, measuring, gauging and monitoring equipments, downhole service tools and the like.

With oil supply scarce, drilling operations must enter more and more hostile environments; with more and more chemical being injected, higher pressures and hotter bottom hole temperatures, still combined with a continuous need for longer life expectancy for all components, a continuous need exist for seals having improved performances.

One of the challenges to be addressed is the problem of explosive decompression (E.D.): this term is used to encompass conditions occurring after an elastomer part is exposed to a fluid under extremely high pressures; these conditions are e.g. encountered when a high pressure valve is suddenly opened or when a flexible gas hose is disconnected. Structural failures in the form of blistering, internal cracking and splits might result when the fluid pressure is suddenly reduced. Actually, the elastomeric components of a system are, to a less or greater extent, susceptible to the permeation and diffusion of fluids, and more particularly gases, dissolving through their surfaces. With time, these components will become saturated with said fluids: as long as the internal gas pressure of the elastomer remains in equilibrium with the surrounding pressure, there is minimal damage (if any) and no deterioration of the performances of the elastomeric component occurs—unless caused by other factors, such as chemical or thermal degradation or by extrusion damage.

However, when the external gas pressure is removed, or pressure fluctuations occur, large pressure gradients are created between the interior and the surface of the elastomeric component, and gas diffused in said component expands and moves toward the surface. If said gradient exceeds the biaxial expansion capabilities of the component, fractures or ruptures will occur through formation of cracks and growth of blister.

Due to their behaviours in above mentioned conditions, and to the relatively poor performances of traditional fluoroelastomer grades, hydrogenated nitrile-butadiene rubbers have been identified as the materials of choice for fields of uses wherein E.D. concerns are key issues; nevertheless, these materials suffer from narrower operating window, in particular for poor performances at temperatures exceeding 200° C. and from poor chemical resistance with respect to certain chemicals.

For meeting the challenge of E.D., but also for ensuring higher continuous service temperatures (generally exceeding 200° C.), and for withstanding a broader range of chemicals, fluoroelastomers possessing improved chemical resistance and mechanical properties, in particular at high temperatures, while still possessing outstanding sealing capabilities, are required, which can furthermore ensure the requested resistance to explosive decompression.

On the other side, fluoroelastomers possessing relatively high molecular weight have been previously described. More particularly, EP 0967248 A (AUSIMONT SPA) 23 Jun. 1998 discloses in its example 3B a VDF/HFP/TFE terpolymer (53.5% moles; HFP 23.5% moles; TFE 23% moles) comprising recurring units derived from bis-olefin and iodinated end-chains derived from the use of 1,6-diiodoperfluorohexane as chain transfer agent (iodine content=0.19% wt), this terpolymer possessing a Mooney viscosity ML (1+10) at 121° C. to ASTM D1646 of 80 Mooney units. This component is used as high Mooney fraction in a multimodal molecular weight composition further comprising a low Mooney and a middle Mooney fraction, so as to yield a compound having a Mooney of 37. In words, high Mooney fluoroelastomers were generally used for formulating fluoroelastomer compositions in admixture with lower molecular weight materials, so as to ensure adequate processability. Nevertheless, these compositions loose their mechanical performances already for temperatures of 100° C. or more, so that they cannot deserve the oil and gas use requirements.

SUMMARY OF INVENTION

The Applicant has now surprisingly found certain peroxide-curable fluoroelastomers which comply with all above mentioned requirements for the oil and gas industry, including explosive decompression, and which can be easily processed to yield cured parts in standard machineries at reasonable throughput rates.

It is thus an object of the present invention a fluoroelastomer [fluoroelastomer (A)] comprising:
  recurring units derived from vinylidene fluoride (VDF);
  recurring units derived from hexafluoropropylene (HFP);
  recurring units derived from at least one bis-olefin [bis-olefin (OF)] having general formula:

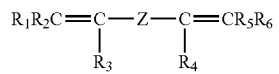

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical; and
  iodine or bromine cure-sites;
  said fluoroelastomer possessing a Mooney viscosity (ML) of at least 85 MU (1+10@121° C.), when measured according to ASTM D1646.

The Applicant has surprisingly found that fluoroelastomers as above detailed, despite their high molecular weight and thus their Mooney viscosities values, can be effectively processed to yield cured parts which possess outstanding sealing and mechanical properties in particular at high temperature and/or after exposure to hostile environments (e.g. to chemicals at high temperature) so as to provide for outstanding behaviour (substantially no failure) in explosive decompression conditions.

For the purposes of this invention, the term "fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer). True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C., even more preferably below −5° C.

Fluoroelastomer (A) typically comprises at least 35% moles, preferably at least 40% moles, more preferably at least 45% moles of recurring units derived from VDF, with respect to all recurring units of the fluoroelastomer.

Fluoroelastomer (A) typically comprises at most 85% moles, preferably at most 80% moles, more preferably at most 78% moles of recurring units derived from VDF, with respect to all recurring units of the fluoroelastomer.

As per the HFP, fluoroelastomer (A) typically comprises at least 10% moles, preferably at least 12% moles, more preferably at least 15% moles of recurring units derived from HFP, with respect to all recurring units of the fluoroelastomer.

Still, fluoroelastomer (A) typically comprises at most 45% moles, preferably at most 40% moles, more preferably at most 35% moles of recurring units derived from HFP, with respect to all recurring units of the fluoroelastomer.

As above mentioned, it is essential for the fluoroelastomer (A) to possess a Mooney viscosity (ML) of at least 85 MU (1+10@121° C.), when measured according to ASTM D1646; fluoroelastomers having Mooney viscosity (ML) of less than 85 MU (1+10@121° C.), when measured according to ASTM D1646, have been found to possess poorer mechanical properties both at low and high temperature, making them unsuitable for being used in aggressive and highly demanding environments such as those of the crude oil exploration, extraction and transportation.

Typically, good results have been obtained with fluoroelastomers (A) possessing Mooney viscosity (ML) of preferably at least 86 MU, preferably at least 87 MU (1+10@121° C.), when measured according to ASTM D1646.

Upper limit for Mooney viscosity (ML) (1+10@121° C.) is not particularly limited; it is nevertheless understood that, to the sake of maintaining high throughput processing capabilities, fluoroelastomers (A) possess Mooney viscosity (ML) of at most 130 MU, preferably at most 125, more preferably at most 120 (1+10@121° C.), when measured according to ASTM D1646, are preferred.

Fluoroelastomers which have been found to provide particularly good performances are those comprising, in addition to recurring units derived from bis-olefin (OF), VDF and HFP:

recurring units derived from derived from at least one (per)fluorinated monomer different from VDF and HFP; and optionally, recurring units derived from at least one hydrogenated monomer.

Non imitative examples of suitable (per)fluorinated monomers are notably:

(a) $C_2$-$C_8$ perfluoroolefins, such as tetrafluoroethylene (TFE), hexafluoroisobutylene;

(b) hydrogen-containing $C_2$-$C_8$ olefins, such as vinyl fluoride (VF), trifluoroethylene (TrFE), perfluoroalkyl ethylenes of formula $CH_2$=$CH$—$R_f$, wherein $R_f$ is a $C_1$-$C_6$ perfluoroalkyl group;

(c) $C_2$-$C_8$ chloro and/or bromo and/or iodo-fluoroolefins such as chlorotrifluoroethylene (CTFE);

(d) (per)fluoroalkylvinylethers (PAVE) of formula $CF_2$=$CFOR_f$, wherein $R_f$ is a $C_1$-$C_6$ (per)fluoroalkyl group, e.g. $CF_3$, $C_2F_5$, $C_3F_7$;

(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

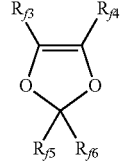

wherein $R_{f3}$, $R_{f4}$, $R_{f5}$, $R_{f6}$, equal or different from each other, are independently selected among fluorine atoms and $C_1$-$C_6$ (per)fluoroalkyl groups, optionally comprising one or more than one oxygen atom, such as notably —$CF_3$, —$C_2F_5$, —$C_3F_7$, —$OCF_3$, —$OCF_2CF_2OCF_3$; preferably, perfluorodioxoles;

(g) (per)fluoro-methoxy-vinylethers (MOVE, hereinafter) having formula:

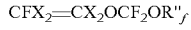

wherein R"f is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$=F, H; preferably $X_2$ is F and R"$_f$ is —$CF_2CF_3$ (MOVE1); —$CF_2CF_2OCF_3$ (MOVE2); or —$CF_3$ (MOVE3).

Examples of hydrogenated monomers are notably non-fluorinated alpha-olefins, including ethylene, propylene, 1-butene, diene monomers, styrene monomers, alpha-olefins being typically used. $C_2$-$C_8$ non-fluorinated alpha-olefins (OI), and more particularly ethylene and propylene, will be selected for achieving increased resistance to bases.

More particularly, those fluoroelastomers which have been found to provide for outstanding performances are those comprising, in addition to recurring units derived from bis-olefin (OF), VDF and HFP:

recurring units derived from tetrafluoroethylene (TFE); and optionally, recurring units derived from at least one hydrogenated monomer and/or recurring units derived from at least one further (per)fluorinated monomer different from VDF, TFE, HFP.

Fluoroelastomer (A) of this embodiment typically comprises at least 0.5% moles, preferably at least 1% moles, more preferably at least 5% moles of recurring units derived from TFE, with respect to all recurring units of the fluoroelastomer.

Still, fluoroelastomer (A) of this embodiment typically comprises at most 35% moles, preferably at most 30% moles, more preferably at most 28% moles of recurring units derived from TFE, with respect to all recurring units of the fluoroelastomer.

The bis-olefin (OF) is preferably selected from the group consisting of those complying with formulae (OF-1), (OF-2) and (OF-3):

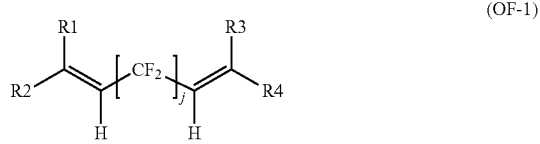
(OF-1)

wherein j is an integer between 2 and 10, preferably between 4 and 8, and R1, R2, R3, R4, equal or different from each other, are H, F or $C_{1-5}$ alkyl or (per)fluoroalkyl group;

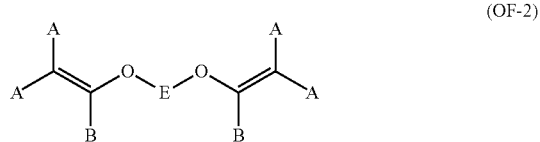
(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$— group, with m being an integer from 3 to 5; a preferred bis-olefin of (OF-2) type is $F_2C=CF—O—(CF_2)_5—O—CF=CF_2$.

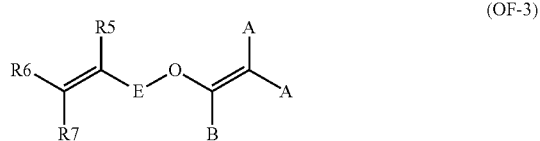
(OF-3)

wherein E, A and B have the same meaning as above defined; R5, R6, R7, equal or different from each other, are H, F or $C_{1-5}$ alkyl or (per)fluoroalkyl group.

While the amount of recurring units derived from bis-olefin (OL) is not particularly limited, for ensuring adequate processability, the amount of said recurring units will be typically of at least 0.01% moles, preferably of at least 0.03% moles, even more preferably of at least 0.05% moles and most preferably of at least 0.1% moles, and typically of at most 5.0% moles, preferably at most 0.5% moles, more preferably at most 0.2% moles, with respect to all other recurring units of the fluoroelastomer.

Most preferred fluoroelastomers (A) are those having following compositions (in mol %):

(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0.01-5.0%;

(ii) vinylidene fluoride (VDF) 35-85%, $C_2$-$C_8$ non-fluorinated olefins (OI) 10-30%, hexafluoropropene (HFP) 18-27% (HFP being possibly partially replaced by perfluoroalkyl vinyl ethers (PAVE), for the rage 0-15%), tetrafluoroethylene (TFE) 10-30%, bis-olefin (OF) 0.01-5%;

(iii) vinylidene fluoride (VDF) 35-85%, (per)fluoromethoxyvinyl ether (MOVE) 5-40%, perfluoroalkyl vinyl ethers (PAVE) 0-30%, tetrafluoroethylene (TFE) 1-35%, hexafluoropropene (HFP) 10-30%; bis-olefin (OF) 0.01-5%.

As said, fluoroelastomer (A) comprises iodine and/or bromine cure sites. Iodine cure sites are those selected for maximizing curing rate.

For ensuring acceptable reactivity it is generally understood that the content of iodine and/or bromine in the fluoroelastomer (A) should be of at least 0.05% wt, preferably of at least 0.1% weight, more preferably of at least 0.15% weight, with respect to the total weight of fluoroelastomer (A).

On the other side, amounts of iodine and/or bromine not exceeding 2% wt, more specifically not exceeding 1% wt, or even not exceeding 0.5% wt, with respect to the total weight of fluoroelastomer (A), are those generally selected for avoiding side reactions and/or detrimental effects on thermal stability.

All these cure sites might be comprised as pending groups bound to the backbone of the fluoroelastomer polymer chain or might be comprised as terminal groups of said polymer chain.

According to a first embodiment, the iodine and/or bromine cure sites are comprised as pending groups bound to the backbone of the fluoroelastomer polymer chain; the fluoroelastomer according to this embodiment typically comprises recurring units derived from brominated and/or iodinated cure-site comonomers selected from:

bromo and/or iodo alpha-olefins containing from 2 to 10 carbon atoms such as bromotrifluoroethylene or bromotetrafluorobutene described, for example, in U.S. Pat. No. 4,035,565 (DU PONT) Jul. 12, 1977 or other compounds bromo and/or iodo alpha-olefins disclosed in U.S. Pat. No. 4,694,045 (DU PONT) 15 Sep. 1987;

iodo and/or bromo fluoroalkyl vinyl ethers (as notably described in U.S. Pat. No. 4,745,165 (AUSIMONT SPA) 17 May 1988, U.S. Pat. No. 4,564,662 (MINNESOTA MINING) Jan. 14, 1986 and EP 199138 A (DAIKIN IND LTD) 29 Oct. 1986).

The fluoroelastomer according to this embodiment generally comprises recurring units derived from brominated and/or iodinated cure-site monomers in amounts of 0.05 to 5 mol per 100 mol of all other recurring units of the fluoroelastomer, so as to advantageously ensure above mentioned iodine and/or bromine weight content.

According to a second preferred embodiment, the iodine and/or bromine cure sites are comprised as terminal groups of the fluoroelastomer polymer chain; the fluoroelastomer according to this embodiment is generally obtained by addition to the polymerization medium during fluoroelastomer manufacture of anyone of:

iodinated and/or brominated chain-transfer agent(s). Suitable chain-chain transfer agents are typically those of formula $R_f(I)_x(Br)_y$, in which $R_f$ is a (per)fluoroalkyl or a (per)fluorochloroalkyl containing from 1 to 8 carbon atoms, while x and y are integers between 0 and 2, with $1 \leq x+y \leq 2$ (see, for example, U.S. Pat. No. 4,243,770 (DAIKIN IND LTD) 6 Jan. 1981 and U.S. Pat. No. 4,943,622 (NIPPON MEKTRON KK) 24 Jul. 1990); and alkali metal or alkaline-earth metal iodides and/or bromides, as described notably in U.S. Pat. No. 5,173,553 (AUSIMONT SRL) 22 Dec. 1992.

The invention also pertains to the use of the fluoroelastomer (A) as above described for fabricating shaped articles.

The fluoroelastomer (A) can then be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomer into a finished article made of non-tacky, strong, insoluble, chemically and thermally resistant cured fluoroelastomer.

The fluoroelastomer of the invention is advantageously cured by peroxide curing technique or by a mixed peroxidic/ionic technique.

The peroxide curing is typically performed according to known techniques via addition of suitable peroxide that is capable of generating radicals by thermal decomposition. Organic peroxides are generally employed.

Still an object of the invention is thus a peroxide curable composition comprising fluoroelastomer (A) as above detailed and at least one peroxide, typically an organic peroxide.

Among most commonly used peroxides, mention can be made of dialkyl peroxides, for instance di-tert-butyl peroxide and 2,5-dimethyl-2,5-bis(tert-butylperoxy)hexane; dicumyl peroxide; dibenzoyl peroxide; di-tert-butyl perbenzoate; bis[1,3-dimethyl-3-(tert-butylperoxy)butyl]carbonate. Other suitable peroxide systems are those described, notably, in patent applications EP 136596 A (MONTEDISON SPA) 10 Apr. 1985 and EP 410351 A (AUSIMONT SRL) 30 Jan. 1991, whose content is hereby incorporated by reference.

Other ingredients generally comprised in the peroxide curable composition, as above detailed, are:

(a) curing coagents, in amounts generally of between 0.5% and 10% and preferably between 1% and 7% by weight relative to the polymer; among these agents, the following are commonly used: triallyl cyanurate; triallyl isocyanurate (TAIC); tris(diallylamine)-s-triazine; triallyl phosphite; N,N-diallylacrylamide; N,N,N',N'-tetraallylmalonamide; trivinyl isocyanurate; 2,4,6-trivinyl methyltrisiloxane; bis-olefins (OF), as above detailed; triazines substituted with ethylenically unsaturated groups, such as notably those described in EP 860436 A (AUSIMONT SPA) 26 Aug. 1998 and WO 97/05122 (DU PONT [US]) 13 Feb. 1997; among above mentioned curing coagents, TAIC and bis-olefins (OF), as above detailed, and more specifically those of formula (OF-1), as above detailed, have been found to provide particularly good results;

(b) optionally, a metallic compound, in amounts of between 1% and 15% and preferably between 2% and 10% by weight relative to the weight of the polymer, chosen from oxides or hydroxides of divalent metals, for instance Mg, Zn, Ca or Pb, optionally combined with a salt of a weak acid, for instance Ba, Na, K, Pb, Ca stearates, benzoates, carbonates, oxalates or phosphites;

(c) optionally, acid acceptors of the metal non-oxide type, such as 1,8-bis(dimethylamino)naphthalene, octadecylamine, etc., as notably described in EP 708797 A (DU PONT) 1 May 1996;

(d) optionally, other conventional additives, such as fillers, thickeners, pigments, antioxidants, stabilizers, processing aids, and the like.

Mixed peroxidic/ionic curing can be achieved by further introducing in the curable composition one or more curing agent and one or more accelerator suitable for ionic curing, as well known in the art. The amounts of accelerator(s) are generally comprised between 0.05 and 5 phr and that of the curing agent typically between 0.5 and 15 phr and preferably between 1 and 6 phr.

Aromatic or aliphatic polyhydroxylated compounds, or derivatives thereof, may be used as curing agents; examples thereof are described, notably, in EP 335705 A (MINNESOTA MINING) 4 Oct. 1989 and U.S. Pat. No. 4,233,427 (RHONE POULENC IND) 11 Nov. 1980. Among these, mention will be made in particular of dihydroxy, trihydroxy and tetrahydroxy benzenes, naphthalenes or anthracenes; bisphenols, in which the two aromatic rings are linked together via an aliphatic, cycloaliphatic or aromatic divalent radical, or alternatively via an oxygen or sulphur atom, or else a carbonyl group. The aromatic rings may be substituted with one or more chlorine, fluorine or bromine atoms, or with carbonyl, alkyl or acyl groups. Bisphenol AF is particularly preferred.

Examples of accelerators that may be used include: quaternary ammonium or phosphonium salts (see, e.g., EP 335705 A (MINNESOTA MINING) 4 Oct. 1989 and U.S. Pat. No. 3,876,654 (DU PONT) 8 Apr. 1975); aminophosphonium salts (see, e.g., U.S. Pat. No. 4,259,463 (MONTEDISON SPA) 31 Mar. 1981); phosphoranes (see, e.g., U.S. Pat. No. 3,752,787 (DU PONT) 14 Aug. 1973); imine compounds of formula $[Ar_3P-N=PAr_3]^{+n}X^{n-}$, with Ar being an aryl group, n=1 or 2 and X being a n-valent anion as described in EP 0120462 A (MONTEDISON SPA) 3 Oct. 1984 or of formula $[(R_3P)_2N]^+X^-$, with R being an aryl or an alkyl group, and X being a monovalent anion, e.g. as described in EP 0182299 A (ASAHI CHEMICAL IND) 28 May 1986. Quaternary phosphonium salts and aminophosphonium salts are preferred.

Instead of using the accelerator and the curing agent separately, it is also possible to use an adduct between an accelerator and a curing agent in a mole ratio of from 1:2 to 1:5 and preferably from 1:3 to 1:5, the accelerator being one of the organic onium compounds having a positive charge, as defined above, and the curing agent being chosen from the compounds indicated above, in particular dihydroxy or polyhydroxy or dithiol or polythiol compounds; the adduct being obtained by melting the product of reaction between the accelerator and the curing agent in the indicated mole ratios, or by melting the mixture of the 1:1 adduct supplemented with the curing agent in the indicated amounts. Optionally, an excess of the accelerator, relative to that contained in the adduct, may also be present.

The following are particularly preferred as cations for the preparation of the adduct: 1,1-diphenyl-1-benzyl-N-diethyl-phosphoranamine and tetrabutylphosphonium; particularly preferred anions are bisphenol compounds in which the two aromatic rings are bonded via a divalent radical chosen from perfluoroalkyl groups of 3 to 7 carbon atoms, and the OH groups are in the para position. A method suitable for the preparation of an adduct as above described is described in European patent application EP 0684277 A (AUSIMONT SPA [IT]) 29 Nov. 1995, which is included herein in its entirety by reference.

Other ingredients generally added to the curable compound comprising the compositions of the invention, when curing via ionic route are:
i) one or more mineral acid acceptors chosen from those known in the ionic curing of vinylidene fluoride copolymers, typically comprised in amounts of 1-40 parts per 100 parts of fluoroelastomer (A);
ii) one or more basic compounds chosen from those known in the ionic curing of vinylidene fluoride copolymers, typically added in amounts of from 0.5 to 10 parts per 100 parts of fluoroelastomer (A).

The basic compounds mentioned in point ii) are commonly chosen from the group constituted by $Ca(OH)_2$, $Sr(OH)_2$, $Ba(OH)_2$, metal salts of weak acids, for instance Ca, Sr, Ba, Na and K carbonates, benzoates, oxalates and phosphites and mixtures of the abovementioned hydroxides with the above mentioned metal salts; among the compounds of the type i), mention may be made of MgO.

The above mentioned amounts of the mixture are relative to 100 phr of fluoroelastomer (A). Also, other conventional additives, such as fillers, thickeners, pigments, antioxidants, stabilizers and the like, may then be added to the curing mixture.

Finally, the invention pertains to cured articles obtained from the fluoroelastomer (A). said cured articles are generally obtained by moulding and curing the peroxide curable composition, as above detailed.

The cured articles can be notably pipes, joints, O-ring; the use of cured articles obtained from fluoroelastomer (A) in the energy or in the oil and gas industry is another aspect of the present invention.

In particular, drilling and raiser devices for extraction and transportation of crude oil, notably in both on-shore and off-shore sites, comprising cured articles obtained from fluoroelastomer (A) are still aspects of the present invention.

Should the disclosure of any of the patents, patent applications, and publications that are incorporated herein by reference conflict with the present description to the extent that it might render a term unclear, the present description shall take precedence.

The present invention will be now described in more detail with reference to the following examples, whose purpose is merely illustrative and not limitative of the scope of the invention.

EXAMPLES

Comparative Example 1

HNBR Rubber

A HNBR rubber commercially available from Zeon under trade name ZEPTOL® 2000 was used for comparative purposes, being understood that HNBR rubber are generally considered as state of the art materials for rapid gas decompression behaviour.

Example 2

Manufacture of a VDF/TFE/HFP Terpolymer having a Mooney Viscosity of 88 MU (1+10@121° C.).

Fluoroelastomer of example 2 was produced according to following procedure:

In a 22 l autoclave, equipped with stirrer working at 460 rpm, were introduced, after evacuation 13.0 l of demineralized water and 97.5 ml of a perfluoropolyoxyalkylene microemulsion previously obtained by mixing: 21.20 ml of an acid terminated perfluoropolyoxyalkylene of formula:

wherein n/m=10, and having an average molecular weight of 600;
7.45 ml of 30% by volume $NH_4OH$ aqueous solution;
56.16 ml demineralized water;
12.69 ml of GALDEN® D02 PFPE of formula:

wherein n/m=20, and having an average molecular weight of 450.

The autoclave was then heated to 80° C. and maintained at such temperature for the entire duration of the reaction. A gazeous mixture of following monomers: vinylidene fluoride (VDF) 47.5% by moles; hexafluoropropene (HFP) 45% by moles; tetrafluoroethylene (TFE) 7.5% by moles, was introduced in the autoclave so as to bring the pressure to 26 bar. 1.04 g of ammonium persulphate (APS) were then introduced in 2 step-wise additions, 0.71 g at the beginning of polymerization and 0.33 g at 20% increment in the monomer conversion. Also, 38.57 g of 1,4-diiodoperfluorobutane ($C_4F_8I_2$) were step-wise introduced as chain transfer agent, a first portion of 5.79 g at the beginning of polymerization, 17.36 g at 20% increment in the monomer conversion and 15.42 g at 80% increment in the monomer conversion. Further, 27.08 g of a bis-olefin having the formula $CH_2=CH-(CF_2)_6-CH=CH_2$ were added in 20 equal parts, each of 1.354 g, beginning from the polymerization starting and for every 5% increment in the monomer conversion. Set-point pressure of 26 bar was maintained constant during polymerization by feeding a mixture consisting of: VDF 70% by moles; HFP 19% by moles; TFE 11% by moles. After 207 min the autoclave was cooled, and the latex was discharged. 451.8 g/l of latex of a terpolymer having Mooney viscosity, ML (1+10) at 121° C. (ASTM D 1646), equal to 88, were thus obtained. The iodine content and the molar monomer composition in the terpolymer were found to be, respectively, 0.24% by weight and VDF 70.6, HFP 17.7, TFE 11.7% by moles; NMR analysis confirmed incorporation in the fluoroelastomer chain of recurring units derived from the above mentioned bis-olefin in an amount of about 0.1% moles, with respect to all other recurring units mentioned above.

Example 3

Manufacture of a VDF/TFE/HFP Terpolymer Having a Mooney Viscosity of 110 MU (1+10@121° C.)

Substantially same procedure followed in example 2 was used, in an autoclave of inner volume of 10 litres agitated at 545 rpm, but:
initially charging the autoclave with a gazeous mixture of following monomers: VDF: 17% by moles; HFP: 70% by moles; TFE: 13% by moles 'til set-point pressure of 26 bar;
initiating reaction by addition of 0.51 g APS (0.35 at the beginning and 0.16 g at 20% increment in conversion, of 18.06 g of $C_4F_8I_2$ (2.71 g at the beginning, 8.13 g at 20% conversion and 7.22 g at 20% conversion) and of 12.13 g of same bis-olefin (in 20 equal parts of 0.61 g every 5% increment of conversion); and maintaining set-point pressure of 26 bar by addition of a mixture consisting of: VDF 48% by moles; HFP 27% by moles; TFE 25% by moles.

After 125 min the autoclave was cooled, and the latex was discharged. 416.1 g/l of latex of a terpolymer having Mooney viscosity, ML (1+10) at 121° C. (ASTM D 1646), equal to 110, were thus obtained. The iodine content and the molar monomer composition in the terpolymer were found to be, respectively, 0.23% by weight and VDF 49.5, HFP 24.6, TFE 25.9% by moles; NMR analysis confirmed incorporation in the fluoroelastomer chain of recurring units derived from the above mentioned bis-olefin in an amount of about 0.1% moles, with respect to all other recurring units mentioned above.

Comparative Example 4

Manufacture of a VDF/TFE/HFP Terpolymer having a Mooney Viscosity of 76 MU (1+10@121° C.) According to EP0967248

A terpolymer was manufacture according to the teachings of example 3B of EP 0967248 A (AUSIMONT SPA) 23 Jun. 1998 for comparative purposes.

Adopting procedure described therein, after 112 min of reaction, a latex was obtained comprising 421 g/l of a terpolymer having Mooney viscosity, ML (1+10) at 121° C. (ASTM D 1646), equal to 76. The iodine content and the molar monomer composition in the terpolymer were found to be, respectively, 0.20% by weight and VDF 52.2, HFP 24.0, TFE 23.8% by moles, and bis-olefin (about 0.1% moles with respect to all other recurring units).

Mechanical and Chemical Resistance Property Determination on Cured Samples

Fluoroelastomers were compounded with the additives as detailed in following table in a Brabender mixer. Plaques and O-rings (size class=214) have been cured in a pressed mould and then post-treated in an air circulating oven in conditions (time, temperature) below specified.

The tensile properties have been determined on specimens punched out from the plaques, according to the DIN 53504 S2 Standard.

M 50 is the tensile strength in MPa at an elongation of 50%

M 100 is the tensile strength in MPa at an elongation of 100%

T.S. is the tensile strength in MPa;

E.B. is the elongation at break in %.

The Shore A hardness (3") (HDS) has been determined on 3 pieces of plaque piled according to the ASTM D 2240 method.

The compression set (C-SET) has been determined on O-ring, spaceman standard AS568A (type 214) or on 6 mm buttons (type 2), according to the ASTM D 395, method B.

Mooney viscosity (ML) (1+10@121° C.) was determined according to ASTM D1646.

Chemical resistance was evaluated according ASTM D471 standard; more precisely, a IRM903 test at 125 and 150° C. during 70 h and a diethanolamine (1% water solution) test at 100° C. during 168 h. Results are summarized herein below in tables 2 to 4.

TABLE 1

| Run | | 1C | 2 | 3 | 4C |
|---|---|---|---|---|---|
| Elastomer | | | | | |
| Zeptol ® 2000 | phr | 100 | | | |
| Fluoroelastomer of ex. 2 | phr | | 100 | | |
| Fluoroelastomer of ex. 3 | phr | | | 100 | |
| Fluoroelastomer of comparative ex. 4 | phr | | | | 100 |
| Other ingredients | | | | | |
| TAIC(*) | phr | | 4 | 4 | 4 |
| Peroxide(**) | phr | | 1 | 1 | 1 |
| Carbon black(***) | phr | | 50 | 40 | 40 |
| Press cure | | 20' at 170° C. | 8' at 170° C. | 5' at 170° C. | 4' at 170° C. |
| Post cure | | 4 h at 150° C. | 4 h at 230° C. | 4 h at 230° C. | 4 h at 230° C. |
| Mechanical Properties at room temperature (23° C.) | | | | | |
| Tensile Strength | MPa | 29.6 | 25 | 31.3 | 16.8 |
| 100% Modulus | MPa | 16.5 | 17.7 | 24.7 | n.d.(+) |
| Elongation @ Break | % | 169 | 127 | 117 | 89 |
| Hardness (Shore A) | pts | 88 | 90 | 90 | 87 |
| Mechanical Properties at 120° C. | | | | | |
| Tensile Strength | MPa | 11.2 | 11.2 | 12.6 | 6 |
| 100% Modulus | MPa | n.d.(+) | 11.2 | n.d.(+) | n.d.(+) |
| Elongation @ Break | % | 90 | 101 | 87 | 50 |
| Mechanical Properties at 150° C. | | | | | |
| Tensile Strength | MPa | 9 | 9.2 | 10.5 | 5.6 |
| Elongation @ Break | % | 79 | 90 | 77 | 46 |
| Sealing properties | | | | | |
| C-set 70 h at 200° C. (6 mm button) | % | 47 | 23 | 15 | 16 |
| Tear strength | | | | | |
| Test Temperature | | | 23° C. | | |
| Tear Strength | N/mm | 42.4 | 33 | 32.9 | 30.4 |
| Test Temperature | | | 120° C. | | |
| Tear Strength | N/mm | 18.4 | 17.7 | 14.4 | 14.1 |
| Test Temperature | | | 150° C. | | |
| Tear Strength | N/mm | 15.9 | 12 | 12.9 | 11.7 |

(*)Crosslinking agent: Drimix ® TAIC 75 supported (triallyl isocyanurate 75% supported on synthetic calcium silicate)
(**)Catalyst agent: LUPEROX ® 101 (ex. 1C and 2) or TRIGONOX ® 101 (ex. 3 and 4), both neat 2,5-dimethyl-2,5-di(t-butylperoxy)hexane ($C_{16}H_{34}O_4$);
(***)Reinforced filler Carbon black N550 FEF;
(+)not measurable; when elongation at break is lower than 100%, determination of modulus at 100% elongation is impossible.

Chemical Resistance Evaluation

Test IRM 903 125° C. for 70 hours—Differences (in % and in points HDS) found in mechanical properties, hardness, weight and volume in specimens submitted to the test.

TABLE 2

| | M50 [%] | M100 [%] | T.S. [%] | EB [%] | HDS [pt] | Wt [%] | Vol [%] |
|---|---|---|---|---|---|---|---|
| Ex. 1C | −23 | −8 | −20% | −16 | −8 | 12 | 16 |
| Ex. 2 | −14 | −11 | −9% | 1 | −1 | 0.8 | 1.6 |

Test IRM 903 150° C. for 70 hours—Differences found in mechanical properties, hardness, weight and volume in specimens submitted to the test.

TABLE 3

| | M50 [%] | M100 [%] | T.S. [%] | EB [%] | HDS [pt] | Wt [%] | Vol [%] |
|---|---|---|---|---|---|---|---|
| Ex. 1C | −17 | −3 | −20 | −18 | −8 | 13 | 17 |
| Ex. 2 | −22 | −20% | −15 | 3 | −2 | 1.5 | 2.9 |

Test in diethanolamine (1% water) at 100° C. during 168 h—Differences found in mechanical properties, hardness, weight and volume in specimens submitted to the test.

TABLE 3

|  | M50 [%] | M100 [%] | T.S. [%] | EB [%] | HDS [pt] | Wt [%] | Vol [%] |
|---|---|---|---|---|---|---|---|
| Ex. 1C | −10 | −8 | −2 | 6 | 1 | 2.0 | 2.5 |
| Ex. 2 | −9 | −10 | 4 | 9 | −1 | 0.9 | 1.7 |

Formulations as detailed in table 1 were designed to provide similar hardness of about 90 ShA, by appropriate tuning of the amount of filler.

From the data of table 1, it is evident that the fluoroelastomers of the invention (examples 2 and 3) develop mechanical properties at room and at high temperature as good as HNBR (comparative example 1) and much better than the fluoroelastomers of the prior art (comparative example 4). Indeed, with the same initial hardness, the fluoroelastomers of the invention maintain a tensile strength of about 10 M Pa even at 150° C. while keeping an elongation at break close to 100%. This is not true for Comparative Example 4 where tensile at break and elongation at break at high temperature vanishes. Further, compression set data of table 1 show that sealing performance of fluoroelastomers are much better than those of HNBR based compound. Tear strength resistance of inventive compounds is also better than that of fluoroelastomer of the prior art.

Data in tables 2, 3 and 4 shows that the fluoroelastomers of the present invention have much better chemical resistance than HNBR based compounds. This is particularly true in very aggressive environments like those of tables 2 and 3.

It is thus clear that the fluoroelastomers of the invention are the only polymers having at the same time good mechanical properties at high temperature and good chemical resistance in very aggressive environments. This combination of property is particularly important in oil field industry where, being in contact with drilling mud, the sealing elements are subjected to aggressive fluids at high temperature.

This peculiar combination of very good chemical resistance and very good mechanical properties at high temperature implies that the fluoroelastomers of the present invention are able to sustain very harsh conditions like those occurring during rapid gas decompression conditions.

The invention claimed is:
1. A method for extracting or transporting fluids in the energy or in the oil and gas industry, comprising passing the fluid through an oil and gas device comprising at least one cured article obtained from a fluoroelastomer (A), wherein the fluoroelastomer (A) comprises:
at least 35% moles and at most 85% moles of recurring units derived from vinylidene fluoride (VDF), with respect to all recurring units of the fluoroelastomer;
at least 10% moles and at most 45% moles of recurring units derived from hexafluoropropylene (HFP), with respect to all recurring units of the fluoroelastomer;
recurring units derived from at least one bis-olefin (OF) having general formula:

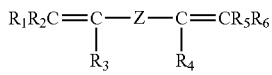

wherein $R_1$, $R_2$, $R_3$, $R_4$, $R_5$ and $R_6$, equal or different from each other, are H, a halogen, or a $C_1$-$C_5$ optionally halogenated group, optionally comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;
at least 0.5% moles and at most 35% moles, of recurring units derived from tetrafluoroethylene (TFE), with respect to all recurring units of the fluoroelastomer; and
iodine or bromine cure-sites;
said fluoroelastomer possessing a Mooney viscosity (ML) of at least 85 MU (1+10@121° C.), when measured according to ASTM D1646, and
said fluoroelastomer has a tensile strength at 23° C., according to the DIN 53504 S2 Standard, ranging from 25 to 31.3 MPa.

2. The method of claim 1, wherein the fluoroelastomer has a Mooney viscosity (ML) of at most 130 MU (1+10@121° C.), when measured according to ASTM D1646.

3. The method of claim 1, wherein the fluoroelastomer has a Mooney viscosity (ML) of at least 86 MU (1+10@121° C.), when measured according to ASTM D1646.

4. The method of claim 3, wherein the fluoroelastomer has a Mooney viscosity (ML) of at most 125 MU (1+10@121° C.), when measured according to ASTM D1646.

5. The method of claim 1, wherein the fluoroelastomer has a Mooney viscosity (ML) of at least 87 MU (1+10@121° C.), when measured according to ASTM D1646.

6. The method of claim 5, wherein the fluoroelastomer has a Mooney viscosity (ML) of at most 120 MU (1+10@121° C.), when measured according to ASTM D1646.

7. The method of claim 1, wherein the recurring units derived from vinylidene fluoride (VDF) are present in an amount ranging from at least 45% moles and at most 80% moles, with respect to all recurring units of the fluoroelastomer; wherein the recurring units derived from hexafluoropropylene (HFP) are present in an amount ranging from at least 15% moles and at most 25% moles, with respect to all recurring units of the fluoroelastomer; and wherein the recurring units derived from tetrafluoroethylene (TFE) are present in an amount ranging from at least 10% moles and at most 30% moles, with respect to all recurring units of the fluoroelastomer.

8. The method of claim 1, comprising, in addition to recurring units derived from said bis-olefin (OF), said VDF and said HFP:
recurring units derived from at least one (per)fluorinated monomer different from said VDF and said HFP; and
optionally, recurring units derived from at least one hydrogenated monomer.

9. The method of claim 8, wherein said (per)fluorinated monomer is selected from the group consisting of:
(a) $C_2$-$C_8$ perfluoroolefins;
(b) hydrogen-containing $C_2$-$C_8$ olefins;
(c) $C_2$-$C_8$ chloro and/or bromo and/or iodo-fluoroolefins;
(d) (per)fluoroalkylvinylethers (PAVE) of formula $CF_2$=$CFOR_f$, wherein $R_f$ is a $C_1$-$C_6$ (per)fluoroalkyl group;
(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms;

(f) (per)fluorodioxoles having formula:

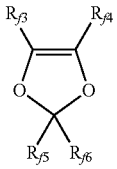

wherein $R_{f3}$, $R_{f4}$, $R_{f5}$, $R_{f6}$, equal or different from each other, are independently selected from the group consisting of fluorine atoms and $C_1$-$C_6$ (per)fluoroalkyl groups, optionally comprising one or more than one oxygen atom; and (g) (per)fluoro-methoxy-vinylethers (MOVE) having formula: $CFX_2\!\!=\!\!CX_2OCF_2OR''_f$ wherein $R''_f$ is selected from the group consisting of $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2\!\!=\!\!F, H$.

10. The method of claim 9, further comprising:
recurring units derived from at least one hydrogenated monomer and/or recurring units derived from at least one other (per)fluorinated monomer different from said VDF, said HFP and said TFE.

11. The method of claim 1, wherein said bis-olefin (OF) is selected from the group consisting of those complying with formulae (OF-1), (OF-2) and (OF-3):

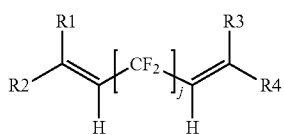

(OF-1)

wherein j is an integer between 2 and 10, and $R_1$, $R_2$, $R_3$, $R_4$, equal or different from each other, are H, F or $C_{1-5}$ alkyl or (per)fluoroalkyl group;

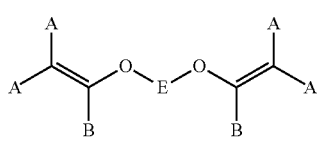

(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages;

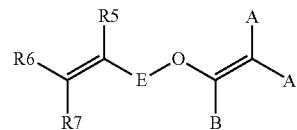

(OF-3)

wherein E, A and B have the same meaning as above defined; $R_5$, $R_6$, $R_7$, equal or different from each other, are H, F or $C_{1-5}$ alkyl or (per)fluoroalkyl group.

12. The method of claim 1, wherein the amount of recurring units derived from said bis-olefin (OL) is of at least 0.01% moles, and of at most 5.0% moles, with respect to all other recurring units of the fluoroelastomer.

13. Drilling and raiser devices for extraction and transportation of crude oil comprising at least one cured article comprising a fluoroelastomer (A) that comprises:
at least 35% moles and at most 85% moles of recurring units derived from vinylidene fluoride (VDF), with respect to all recurring units of the fluoroelastomer;
at least 10% moles and at most 45% moles of recurring units derived from hexafluoropropylene (HFP), with respect to all recurring units of the fluoroelastomer;
recurring units derived from at least one bis-olefin (OF) having general formula:

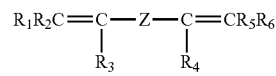

wherein $R_1$, $R_2$, $R_3$, $R_4$, $R_5$ and $R_6$, equal or different from each other, are H, a halogen, or a $C_1$-$C_5$ optionally halogenated group, optionally comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical;
at least 0.5% moles and at most 35% moles, of recurring units derived from tetrafluoroethylene (TFE), with respect to all recurring units of the fluoroelastomer; and
iodine or bromine cure-sites;
said fluoroelastomer possessing a Mooney viscosity (ML) of at least 85 MU (1+10@121° C.), when measured according to ASTM D1646, and
said fluoroelastomer has a tensile strength at 23° C., according to the DIN 53504 S2 Standard, ranging from 25 to 31.3 MPa.

14. The method of claim 12, wherein the amount of recurring units derived from said bis-olefin (OL) is of at least 0.05% moles, and of at most 0.2% moles, with respect to all other recurring units of the fluoroelastomer.

15. The method of claim 11, wherein the fluoroelastomer (A) comprises, all with respect to all other recurring units of the fluoroelastomer:
at least 45% moles and at most 78% moles of recurring units derived from VDF;
at least 15% moles and at most 35% moles of recurring units derived from HFP;
at least 0.05% moles, and of at most 0.2% moles recurring units derived from OF-1; and
at least % moles and at most 28% moles, of recurring units derived from TFE,
wherein the fluoroelastomer possesses a Mooney viscosity (ML) of at least 85 MU and at most 120 MU (1+10@121° C.), when measured according to ASTM D1646.

* * * * *